United States Patent
Ducas et al.

(10) Patent No.: US 11,707,793 B2
(45) Date of Patent: Jul. 25, 2023

(54) DEVICE FOR HOLDING ONE OR MORE ELECTRODE(S) FOR ELECTRICAL DISCHARGE MACHINING, AND METHOD OF OBTAINING SAME

(71) Applicant: Safran, Paris (FR)

(72) Inventors: Martin Ducas, Moissy-Cramayel (FR); Mirna Bechelany, Moissy-Cramayel (FR)

(73) Assignee: Safran, Paris (FR)

( * ) Notice: Subject to any disclaimer, the term of this patent is extended or adjusted under 35 U.S.C. 154(b) by 588 days.

(21) Appl. No.: 16/651,761

(22) PCT Filed: Sep. 28, 2018

(86) PCT No.: PCT/FR2018/052397
§ 371 (c)(1),
(2) Date: Mar. 27, 2020

(87) PCT Pub. No.: WO2019/063953
PCT Pub. Date: Apr. 4, 2019

(65) Prior Publication Data
US 2020/0254546 A1    Aug. 13, 2020

(30) Foreign Application Priority Data
Sep. 29, 2017    (FR) ..................... 1759110

(51) Int. Cl.
*B23H 7/26* (2006.01)
*B23H 1/04* (2006.01)
(Continued)

(52) U.S. Cl.
CPC .............. *B23H 7/26* (2013.01); *B23H 7/265* (2013.01); *B23H 7/36* (2013.01); *B23H 9/10* (2013.01);
(Continued)

(58) Field of Classification Search
CPC ... B23H 1/04; B23H 1/08; B23H 1/10; B23H 9/14
See application file for complete search history.

(56) References Cited

U.S. PATENT DOCUMENTS

| | | | |
|---|---|---|---|
| 5,055,650 A | 10/1991 | Barthes et al. | |
| 6,225,589 B1 | 5/2001 | Bartok | |
| 2012/0132623 A1* | 5/2012 | Justice, Jr | B23H 7/265 |
| | | | 219/69.15 |

FOREIGN PATENT DOCUMENTS

| | | |
|---|---|---|
| DE | 101 03 292 A1 | 8/2002 |
| EP | 0 449 694 B1 | 1/1993 |

(Continued)

OTHER PUBLICATIONS

J. Deckers et al., "Additive Manufacturing of Ceramics: A Review", J. Ceram. Sci. Tech, Nov. 1, 2014, vol. 5, No. 4, pp. 245-260.

*Primary Examiner* — Geoffrey S Evans
(74) *Attorney, Agent, or Firm* — Blank Rome LLP

(57) ABSTRACT

The production of a device for holding one or more electrodes for electrical discharge machining, comprising a body having a rectilinear portion in which at least one first duct is provided for the passage of one or more electrode(s). The body further has an integral curved portion in which (at least) one second curved dielectric fluid supply duct is provided and in which is provided a curved extension of said at least one first duct. The curved extension and the second curved duct are made of ceramic, with an inner mean roughness of: Ra<2 μm.

10 Claims, 4 Drawing Sheets

(51) Int. Cl.
    *B23H 7/36*           (2006.01)
    *B23H 9/10*           (2006.01)
    *C04B 35/10*         (2006.01)
    *B33Y 80/00*         (2015.01)
    *B33Y 40/20*         (2020.01)
    *B33Y 70/00*         (2020.01)
    *B23H 9/14*           (2006.01)

(52) U.S. Cl.
    CPC ............... *B33Y 40/20* (2020.01); *B33Y 80/00* (2014.12); *C04B 35/10* (2013.01); *B23H 9/14* (2013.01); *B33Y 70/00* (2014.12); *C04B 2235/3217* (2013.01); *C04B 2235/3244* (2013.01); *C04B 2235/6026* (2013.01)

(56) References Cited

FOREIGN PATENT DOCUMENTS

| | | | |
|---|---|---|---|
| RU | 2 455 133 C1 | 7/2012 | |
| WO | WO-2007133258 A2 * | 11/2007 | ............ B22F 3/1055 |
| WO | WO-2016124432 A1 * | 8/2016 | ......... B29C 33/3828 |

\* cited by examiner

DEVICE FOR HOLDING ONE OR MORE ELECTRODE(S) FOR ELECTRICAL DISCHARGE MACHINING, AND METHOD OF OBTAINING SAME

This application is a national stage of International Application No. PCT/FR2018/052397, filed on Sep. 28, 2018, which claims the benefit of French Patent Application No. 1759110, filed Sep. 29, 2017, the contents of each of which are incorporated herein by reference.

The present invention relates to a (guide) device for holding one or more electrode(s) for electrical discharge machining (EDM), and the method of obtaining same.

The field of application concerned is that of gas turbomachines for aircrafts.

For example in EP 0449694 is presented such an electrode(s) holding device comprising a body having a rectilinear portion in which a first electrode(s) passage duct is provided.

In the present text, any expression "one" covers "at least one", i.e. one or more.

Problems in this area include, for example, drilling a high-pressure multi-blade nozzle vane in an aircraft gas turbomachine, in conjunction with the accessibility of the EDM drilling electrode in an inter-blade area.

The main constraints are:
maintaining the properties of the standard guides (electrical insulation, adaptation to a conventional machine interface, low wear rate, mechanical resistance . . . );
having a fine geometry, and adapted in shape, to access the inter-blade area and make/machine holes there,
bringing a dielectric (machining fluid) into a drilling area that is typically confined.

In addition, and in general, we can note the importance of:
how to define an EDM device with geometry adapted in shape and size to access inaccessible machining areas,
ensuring that the device is obtained quickly and inexpensively, ensuring that the device then allows long machining times,
allowing a specific device to be made for each machining situation, if necessary,
then allowing for the automation of the operation of the device, in particular for the drilling orientations.

In order to respond to at least part of this problem, it is proposed that the device presented above shall be such that said body also has a curved integral portion in which a second curved dielectric fluid supply duct is provided and where a curved extension of said first duct passes (i.e. is provided), through which the electrode(s) pass(es), the curved extension and the second curved duct being made of ceramic, with an inner mean roughness of: Ra<2 µm, preferably Ra<0.5 µm.

In order to further promote accessibility and ease of installation on existing tools, it is proposed:
that, in the rectilinear section, a rectilinear extension of the second curved duct will also be provided,
that the curved and rectilinear portions will be distinct from each other, and glued together, end to end, the rectilinear portion having connecting means for a connection with an electrical discharge micro drilling machine (EDM).

In order to further promote the supply of the dielectric (machining fluid) to the machining area, it is also available individually or in combination:
a plurality of said second curved ducts are provided surrounding the curved extension of the first duct, coaxially with the curved extension of said first duct, that these second curved ducts together have, perpendicular to the axis along which they extend coaxially, a cross-section between 4 and 8 mm².

In fact, a laminar flow of fluid in the machining area, local immersion, and stability of the electric arc created between the electrode concerned and the part will be favoured: The machining area is completely immersed in the dielectric.

In order to allow/favour an orientation of the electrode concerned in its receiving duct, it is further proposed that at least in the curved portion, said curved extension will have an inner mean roughness of 0.01 µm<Ra<0.3 µm.

This will invite all the more to use, as a production method specifically dedicated to the production of the above-mentioned electrode(s) holding device, with all or part of the stated characteristics, a method comprising an additive manufacture of the device from a ceramic material.

The term ceramic material is defined as such a material, as such (such as alumina, zirconia, silicon nitride, etc.) or as a ceramic composite; ceramic matrix composite or CMC.

With this method, the guide device will therefore incorporate means for supplying the (dielectric) machining fluid, via the second duct(s), which would not have been possible with a machined guide.

In addition, with such a method, it will be possible, possibly in combination, to plan:
that the ceramic material will comprise alumina and zirconia,
that the ceramic material will comprise alumina and zirconia particles dispersed into the alumina structure and will be obtained by wet mixing,
that after the additive manufacture, an after-treatment of the interior of (inside) the second curved duct, and preferably of the entire interior of said integral curved portion, will be carried out by abrasive flow machining (AFM).

In this way, the optimization of the parameters of the additive method will be favoured in a fast, controlled, easily repeatable and cost-effective way, in order to respond favourably to the different requirements in terms of geometric and dimensional characteristics as well as with respect to the expected surface condition inside the ducts.

The invention will, if necessary, be better understood and other details, characteristics and advantages will become apparent on reading the following description given as a non-exhaustive example and with reference to the appended drawings in which:

FIG. 1 shows a schematic diagram of an aircraft gas turbomachine;

FIGS. 2, 3 give an example of the type of part concerned by the application of the device of the invention, as known in the prior art;

Figure 7:
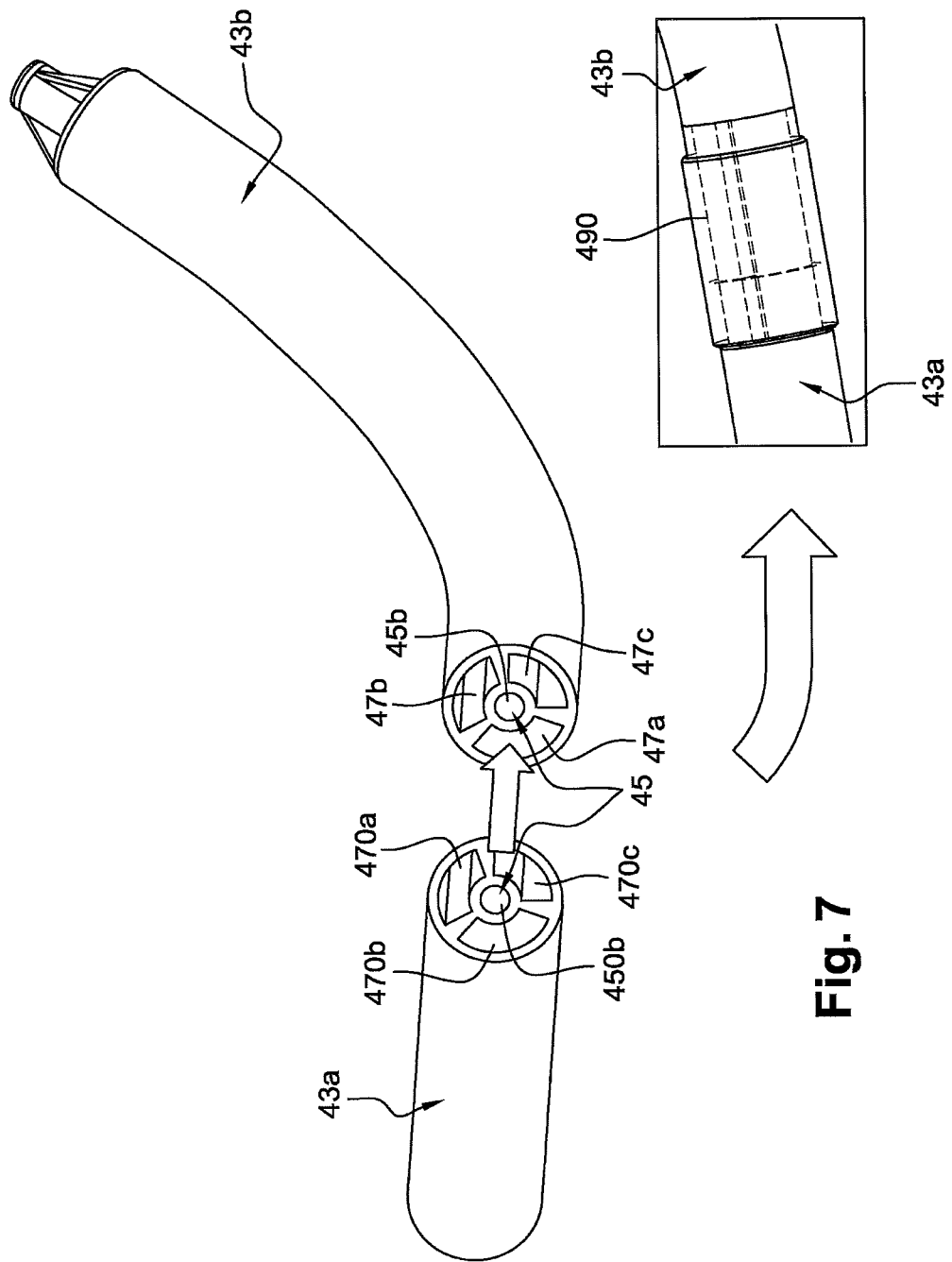

and FIG. 7 shows the inner construction of said rectilinear and curved portions and a possible connection between same.

DETAILED DESCRIPTION

Figure 1:
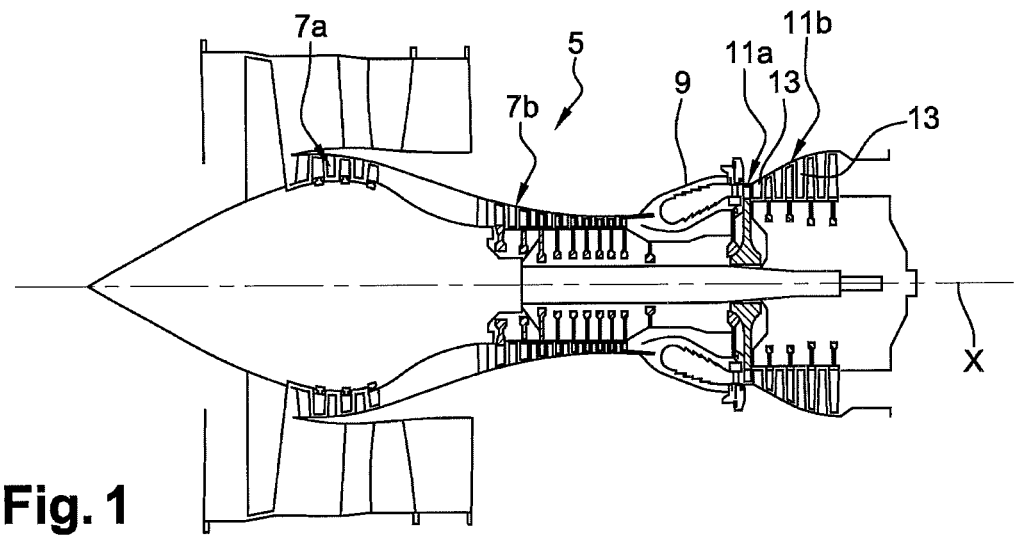
Figure 2:
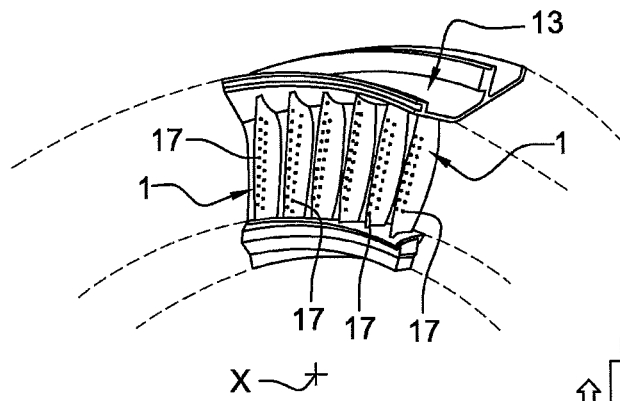
Figure 3:
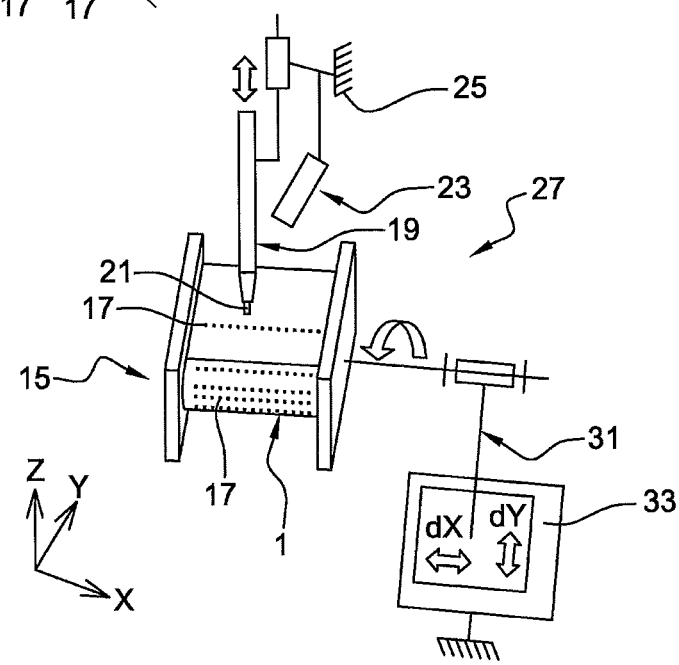

An example of the type of part concerned by the application of the device of the invention is shown in FIGS. 2 and 3. This is a high-pressure nozzle 3 vane 1 in a turbomachine 5, as shown in FIG. 1. Blade 1 can be multi-vaned.

This is therefore not satisfactory.

As known, an aircraft gas turbomachine, such as the one marked 5, typically has an air inlet (plenum) that forms an opening for the admission of air flow to the engine proper. Usually, the turbomachine comprises one or more section(s) for compressing the intake air (usually a low pressure section 7a and a high pressure section 7b). The compressed air is fed into the combustion chamber 9 and mixed with fuel before being burnt.

The hot combustion gases are then expanded into different turbine stages 11a, 11b, such as a high-pressure stage 11a immediately downstream of the chamber, then low-pressure turbine stages 11b.

Each turbine stage, such as 11a or 11b, has a row of stationary blades, also called a nozzle 13, followed by a row of mobile blades spaced circumferentially around the turbine disc. The nozzle 13 diverts and accelerates the gas flow from the combustion chamber to the turbine rotor blades in order to rotate the turbine blades and the turbine disc. The axis of rotation is marked with an X.

The nozzle 13 thus comprises a plurality of vanes 1 arranged radially with respect to the X axis and connecting a radially inner annular element (or an inner platform) and a radially outer annular element (or an outer platform). The assembly forms an annular jet opposite the turbine mobile blades.

The stationary blades 1 are thus arranged in a ring (see the dotted line in FIG. 2), which can, if necessary, be divided into a plurality of segments distributed circumferentially around the X-axis. Each segment, such as the very schematic one marked 15 in FIG. 3 or 8, comprises one or more adjacent stationary blade(s) 1 attached to a ring sector element to form the nozzle 13.

The nozzle vanes are generally obtained as cast and can be made from a nickel-based super-alloy or a single crystal material with very good thermal resistance. In particular, high-pressure turbine nozzles 13 are parts that are exposed to very high thermal stress.

In order to lower the temperature and limit its degradation, cooling of the nozzles is often necessary. Holes 17, e.g. provided in inserts positioned in the interior of the vanes, allow the nozzles to be cooled. "Fresh" air taken from the compressor of the turbomachine can impact the inner face of the blade through these holes to cool same.

The holes 17 can be drilled on the vane 1, typically by EDM or laser.

In FIG. 3, which shows a solution of the prior art, the holes 17 are accessible with an electrical discharge machining (EDM) tool which comprises a straight (rectilinear) drilling device or guide 19 from which an electrode 21 emerges. A nozzle 23, which is stationary with respect to the frame 25 of the drilling machine 27, allows the drilling area to be sprayed with a dielectric fluid. The part to be drilled can be orientated (dX, dY orientations) by means of moving means 31, via an orientation table 33.

Drilling, especially in such a situation, can lead to the following problems, as already noted:
  if possible keep the properties of the standard guides,
  ensure that the EDM drilling electrode has adequate accessibility, especially when the area in question is cramped, poorly accessible or even tortuous,
  configure a simple geometry adapted to several possible configurations accordingly,
  improve the conditions for drilling/machining, while limiting the duration.

Figure 4:
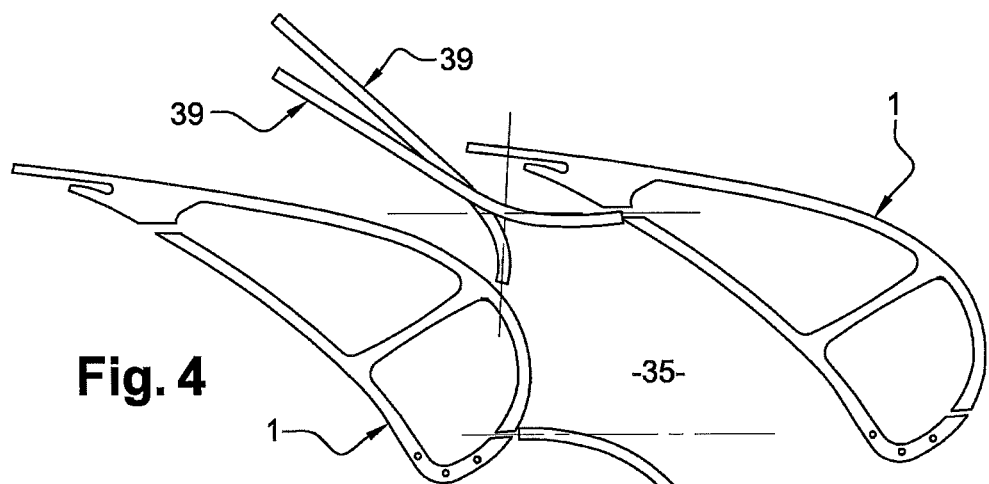
FIG. 4 is an example of interventions between two successive stationary blades, on an intervention area 35 that is not easily accessible, and with an evolutionary curvature.

An example of interventions raising this type of problem is shown in FIG. 4, where two successive stationary blades 1 are shown, with an intervention area 35 between them that is not easily accessible, and with an evolutionary curvature.

Figure 5:
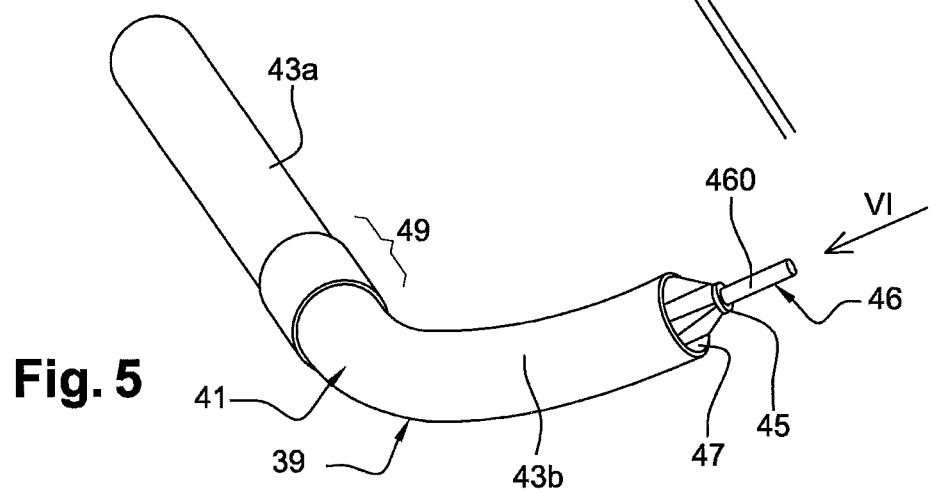
FIGS. 5 and 8 show a diagram of an electrode(s) holding device for an electrical discharge machining conforming to the invention.
Figure 6:
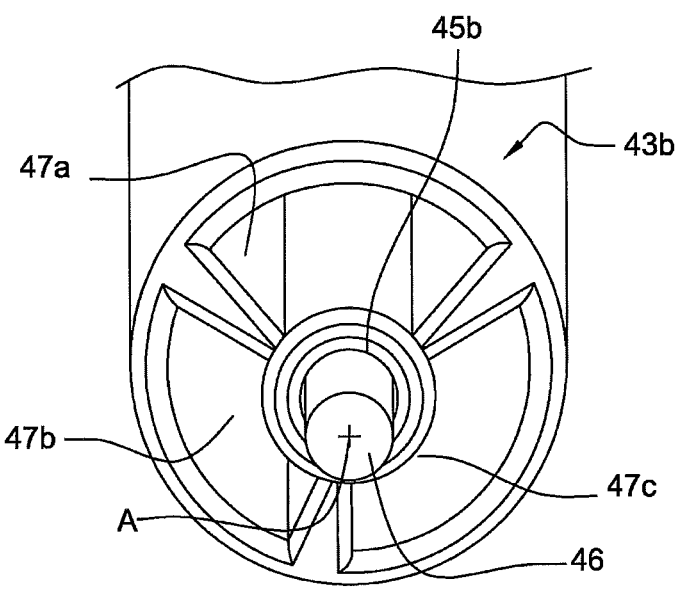
FIG. 6 is a front view along the arrow VI in FIG. 5.
Figure 8:
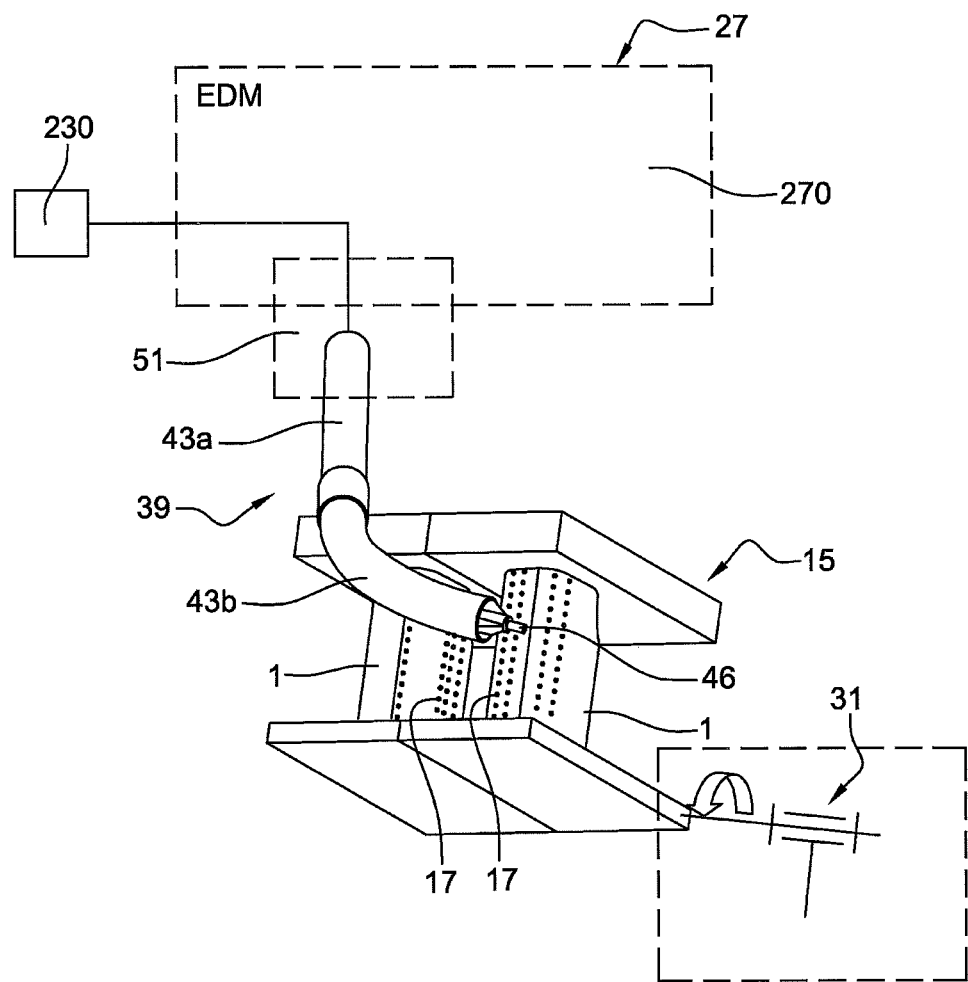

It is therefore proposed to replace the straight (rectilinear) drilling device or guide 19 with the EDM electrode(s) holding device 39; see FIGS. 5, 6, 8 in particular.

The device 39 comprises a body 41 which has a tubular, rectilinear 43a and then curved 43b portion, each being integral.

At least in the curved portion, it can be seen in FIG. 5, 6 or 7 that:
  (at least) one first duct 45 for the passage of at least one electrode 46, in this case a single one,
  and (at least) one second dielectric fluid supply duct 47 from the free end of the body, where the active end 460 of the electrode 46 which will come into contact with the part to be machined opens, are provided.

In the preferred example shown, this second duct 47 has several, here three 47a,47b,47c, radial segments arranged around the elongation direction A of the body 41, this direction being rectilinear and then curved.

In the centre, the electrode 46 passes through a curved extension 45b which preferably follows the (at least) first duct 45.

It is preferable for the three curved segments 47a,47b,47c to be derived, in the rectilinear portion, from as many rectilinear segments, 470a,470b,470c in the example (FIG. 7), arranged in correspondence, coaxially, and in communication with same.

In this case, the curved extension 45b will preferably itself be derived, in the rectilinear portion, from a central rectilinear section 450b of the duct 45 for the passage of the electrode 46, and in communication therewith.

The curved extension 45b of said (at least) one first duct and the second curved duct (47; 47a,47b,47c,470a,470b, 470c) in which this curved extension 45b is thus provided are made of ceramic material, with an inner mean roughness of: Ra<2 µm.

This allows for an inexpensive, integral construction that can be reproduced quickly and easily, in particular by additive three-dimensional (3D) manufacturing of the device by DLP (Digital Light Processing™) from a (composite or not) ceramic material.

In the preferred example shown, there are several so-called second curved ducts 47a,47b,47c surrounding the central curved extension 45b of the first duct, coaxially with this curved extension.

As already mentioned, these second curved ducts will favorably and together have a section perpendicular to the axis along which they extend coaxially between 4 and 8 mm². Thus, the machining area can be favourably supplied with dielectric and, in particular, local immersion will be possible.

Making the electrode(s) holding device 39 with, at least in the curved portion, one said curved extension 45b and/or a second duct 47 having an inner mean roughness 0.01 µm<Ra<0.3 µm will limit the friction of the electrode on the walls of the guide and thus promote the movement of the electrode.

In particular, to allow the use of the curved portions 43b differentiated according to the requirements (different curvatures, different lengths, even different diameters . . . ), it has been provided that the respectively curved and rectilinear portions will be structurally distinct from each other, glued together, butt-jointed end to end 49, or connected via a coupling or a sleeve 490 if necessary (FIG. 7).

The rectilinear portion 43a will then additionally have means 51 for connection with one head 270 of the drilling machine 27.

The dielectric fluid will come from a source 230 (FIG. 8) and will therefore be admitted into the electrode(s) holding device 39 to spray the drilling area as closely as possible with this fluid.

Concerning the production method already mentioned, the ceramic material will favourably include alumina and zirconia.

The advantages of two materials can then be exploited: the hardness and chemical inertness of alumina, and the phase-transformation strengthening of zirconia. One way to achieve this could be to create a homogeneous dispersion of zirconia grains into an alumina matrix. A crack propagating in such a material will cause the q-m transformation of the zirconia grains, and will therefore be slowed down by the compressive stresses resulting from the transformation. This requires two conditions: on the one hand, the zirconia grains have to be initially quadratic, and on the other hand, they have to be susceptible to transformation under stress.

Once again, to ensure a compromise between a performance in terms of the positioning of the electrode 46 and the supply of the dielectric fluid with a good flow quality and a cheap, fast and possibly serial production of the device 39, it is proposed to use, after the additive production, to an after-treatment of the interior of the second curved duct(s) 47; 47a,47b,47c, and preferably the entire interior of said integral curved portion 43b, by abrasive flow machining (AFM). This type of machining by extrusion of an abrasive paste will make it possible to simultaneously shape several cavities on the same part as well as to process several dozen parts in a single assembly. The tooling can easily be designed to be changed in a few minutes for production applications.

The invention claimed is:

1. A device for holding one or more electrodes for an electrical discharge machining, the device comprising a body having a rectilinear portion in which at least one first duct is provided for the passage of one or more electrodes, characterised in that said body further has an integral curved portion which at least one second curved dielectric fluid supply duct is provided and which is passed through by a curved extension of said at least one first duct in which the one or more electrodes pass, said curved extension and the second curved duct being made of a ceramic material, with an inner mean roughness of: Ra<2 µm.

2. The device for holding one or more electrodes according to claim 1, comprising a plurality of said second curved ducts surrounding the curved extension of the first duct, coaxially with the curved extension of said first duct.

3. The device for holding one or more electrodes according to claim 1, in which, in the rectilinear portion, a rectilinear extension of the second curved duct is provided.

4. The device for holding one or more electrodes according to claim 2, in which the second curved ducts together have a cross-section perpendicular to the axis along which they coaxially extend between 4 and 8 mm$^2$.

5. The device for holding one or more electrodes according to claim 1 in which, at least in the curved portion, said curved extension has an inner mean roughness of 0.0 µm<Ra<0.3 µm.

6. The device for holding one or more electrodes according to claim 1, in which the curved and rectilinear portions are distinct from each other, glued together, end to end, with the rectilinear portion having connecting means for a connection with an electrical discharge micro-drilling machine.

7. The method of production specifically dedicated to the manufacture of the device for holding one or more electrodes according to claim 1, said method comprising an additive manufacture of the device from a ceramic material.

8. The method according to claim 7, wherein the ceramic material comprises alumina and zirconia.

9. The method according to claim 7, wherein the ceramic material comprises alumina and zirconia particles dispersed into the alumina structure and is obtained by wet mixing.

10. The method according to claim 7, wherein, after the additive manufacture, an after-treatment inside the second curved duct, and preferably of the entire interior of said integral curved portion, is carried out by an abrasive flow machining.

* * * * *